US007333955B2

(12) United States Patent
Graves et al.

(10) Patent No.: US 7,333,955 B2
(45) Date of Patent: Feb. 19, 2008

(54) SYSTEM AND METHOD FOR SECURING COMMUNICATION SERVICE

(75) Inventors: Phillip Craig Graves, Atlanta, GA (US); Merrill Brooks Smith, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 317 days.

(21) Appl. No.: 10/253,243

(22) Filed: Sep. 24, 2002

(65) Prior Publication Data
US 2003/0172031 A1 Sep. 11, 2003

Related U.S. Application Data

(60) Provisional application No. 60/324,333, filed on Sep. 24, 2001, provisional application No. 60/396,404, filed on Jul. 15, 2002.

(51) Int. Cl.
*G06Q 40/00* (2006.01)
(52) U.S. Cl. .................. 705/44; 705/35; 705/37; 705/39; 235/375; 235/379; 235/380; 235/381; 235/382; 235/385
(58) Field of Classification Search .......... 705/39, 705/44, 35; 235/377–382, 375, 385
See application file for complete search history.

(56) References Cited

U.S. PATENT DOCUMENTS

| 5,577,109 | A | 11/1996 | Stimson et al. |
| 5,903,830 | A | 5/1999 | Joao et al. |
| 5,918,909 | A | 7/1999 | Fiala et al. |
| 5,945,653 | A | 8/1999 | Walker et al. |
| 6,000,608 | A | * 12/1999 | Dorf ............................ 235/380 |
| 6,012,049 | A | 1/2000 | Kawan |
| 6,038,549 | A | 3/2000 | Davis et al. |
| 6,088,682 | A | 7/2000 | Burke |
| 6,185,545 | B1 | 2/2001 | Resnick et al. |
| 6,188,752 | B1 | 2/2001 | Lesley |

(Continued)

FOREIGN PATENT DOCUMENTS

EP 1164777 A3 10/2003

(Continued)

OTHER PUBLICATIONS

Michlig et al. "Fork in the Road", Credit Card Management, V22, n10 Oct. 1999, pp. 36-38.*

(Continued)

*Primary Examiner*—Narayanswamy Subramanian
(74) *Attorney, Agent, or Firm*—Hunton & Williams LLP

(57) ABSTRACT

A system and method for supplying communication service value is disclosed. In one embodiment, the method includes distributing indicia of an identifier to a merchant for distribution to a customer having a customer account. The identifier has an associated service value that is redeemable with a plurality of carriers. The method further includes activating the identifier upon distribution of the indicia to the customer, receiving a request from the customer to add the associated service value to the customer account, and adding the associated service value to the customer account is disclosed. In a further embodiment, the request includes identifier input and customer account input, and receiving a request from the customer to add the associated service value of the identifier to the customer account further includes verifying the identifier input and verifying the customer account input.

23 Claims, 9 Drawing Sheets

U.S. PATENT DOCUMENTS

| | | | |
|---|---|---|---|
| 6,189,787 B1 | 2/2001 | Dorf | |
| 6,208,851 B1 | 3/2001 | Hanson | |
| 6,282,566 B1 | 8/2001 | Lee, Jr. et al. | |
| 6,285,749 B1 | 9/2001 | Manto | |
| 6,311,170 B1 | 10/2001 | Embrey | |
| 6,314,171 B1 | 11/2001 | Dowens | |
| 6,315,206 B1 | 11/2001 | Hansen et al. | |
| 6,330,544 B1 | 12/2001 | Walker et al. | |
| 6,333,976 B2 | 12/2001 | Lesley | |
| 6,375,073 B1 | 4/2002 | Aebi et al. | |
| 6,424,706 B1* | 7/2002 | Katz et al. | 379/144.01 |
| 6,434,379 B1 | 8/2002 | Despres et al. | |
| 6,445,780 B1 | 9/2002 | Rosset | |
| 6,473,500 B1* | 10/2002 | Risafi et al. | 379/144.01 |
| 6,478,401 B1 | 11/2002 | King et al. | |
| 6,494,637 B2 | 12/2002 | Huber | |
| 6,507,644 B1 | 1/2003 | Henderson et al. | |
| 6,529,593 B2 | 3/2003 | Nelson | |
| 6,581,827 B2 | 6/2003 | Welton | |
| 6,588,658 B1 | 7/2003 | Blank | |
| 6,592,035 B2 | 7/2003 | Mandile | |
| 6,745,022 B2 | 6/2004 | Knox | |
| 6,934,529 B2 | 8/2005 | Bagoren et al. | |
| 7,086,584 B2 | 8/2006 | Stoutenburg et al. | |
| 7,131,582 B2 | 11/2006 | Welton | |
| 7,243,839 B2* | 7/2007 | Beck et al. | 235/380 |
| 2001/0000808 A1 | 5/2001 | Lesley | |
| 2001/0001321 A1 | 5/2001 | Resnick et al. | |
| 2001/0023415 A1 | 9/2001 | Keil | |
| 2001/0042784 A1 | 11/2001 | Fite | |
| 2002/0022966 A1 | 2/2002 | Horgan | |
| 2002/0077076 A1 | 6/2002 | Suryanarayana et al. | |
| 2002/0091573 A1 | 7/2002 | Hodes | |
| 2002/0101966 A1 | 8/2002 | Nelson | |
| 2002/0115424 A1 | 8/2002 | Bagoren et al. | |
| 2002/0119767 A1 | 8/2002 | Fieldhouse et al. | |
| 2002/0133457 A1 | 9/2002 | Gerlach et al. | |
| 2003/0004889 A1 | 1/2003 | Fiala | |
| 2003/0194988 A1 | 10/2003 | Knox | |
| 2003/0200179 A1* | 10/2003 | Kwan | 705/65 |
| 2003/0218062 A1 | 11/2003 | Noriega et al. | |
| 2004/0009760 A1 | 1/2004 | Laybourn et al. | |
| 2004/0218741 A1 | 11/2004 | Welton | |
| 2004/0230536 A1 | 11/2004 | Fung et al. | |
| 2004/0267663 A1 | 12/2004 | Karns et al. | |
| 2005/0127169 A1* | 6/2005 | Foss, Jr. | 235/380 |
| 2005/0131815 A1* | 6/2005 | Fung et al. | 705/39 |
| 2005/0263587 A1* | 12/2005 | Martinez | 235/380 |
| 2006/0023856 A1 | 2/2006 | Welton | |
| 2006/0085335 A1 | 4/2006 | Crawford et al. | |
| 2006/0161490 A1 | 7/2006 | Chakiris et al. | |
| 2006/0163347 A1* | 7/2006 | Foss et al. | 235/380 |
| 2006/0213985 A1 | 9/2006 | Walker et al. | |
| 2006/0255125 A1* | 11/2006 | Jennings et al. | 235/380 |
| 2006/0289621 A1* | 12/2006 | Foss et al. | 235/375 |
| 2007/0057045 A1* | 3/2007 | Beck et al. | 235/380 |
| 2007/0187490 A1* | 8/2007 | Feldman et al. | 235/380 |

FOREIGN PATENT DOCUMENTS

| | | |
|---|---|---|
| GB | 2 333 878 A | 8/1999 |
| WO | WO 01/22333 A1 * | 3/2001 |

OTHER PUBLICATIONS

"Hypercom Introduces Quick-Service Payment Options for the Retail and Restaurant Countertop and Drive Through" Business Wire Apr. 11, 2002.*

Dahl, Judy "Card Fraud", Credit Union Magazine, Jun. 2006, pp. 46-51.*

WIPO, International Search Report dated Mar. 3, 2004, International Patent Application No. PCT/US02/30281, 5 pages (and 4 accompanying documents).

* cited by examiner

SYSTEM AND METHOD FOR SECURING COMMUNICATION SERVICE

This application claims priority of U.S. Provisional Patent Application Nos. 60/324,333 filed on Sep. 24, 2001 and 60/396,404 filed on Jul. 15, 2002, which are incorporated herein by reference in their entirety.

BACKGROUND OF THE INVENTION

The invention relates generally to systems and methods for supplying communication service value.

With the expansion of the mobile telephone industry, and increased use of mobile telephones by everyday persons ranging from businessmen to teenagers, carriers must look to new and innovative business models for the services they provide. It has become common for mobile telephone carriers to offer service plans that provide the customer with a predetermined number of minutes within certain network restrictions for a fixed monthly fee.

However, an emerging market is that of prepaid service, otherwise known as pay as you go service. With prepaid service, customers have the freedom to choose when and how they will pay for wireless services. One disadvantage with prepaid service is that the service must be paid for in advance, which may cause problems if the customer needs service, but cannot get to an accessible point of sale to purchase the carrier time. Another disadvantage is that the prepaid services are carrier specific and the mechanisms to acquire more prepaid service are through the carriers. There is no central mechanism to acquire prepaid service that allows customers from different carriers to acquire service irregardless of their carrier.

The invention provides systems and methods for obtaining wireless service value, that overcome the disadvantages of known systems and methods while offering features not present in known systems and methods.

BRIEF SUMMARY OF THE INVENTION

In accordance with one embodiment of the invention, a method for supplying communication service value is disclosed. The method first includes distributing indicia of an identifier to a merchant for distribution to a customer having a customer account. The identifier has an associated service value that is redeemable with a plurality of carriers. The method further includes activating the identifier upon distribution of the indicia to the customer, receiving a request from the customer to add the associated service value to the customer account, and adding the associated service value to the customer account. In a further embodiment, the request includes identifier input and customer account input, and the receiving the request to add the associated service value to the customer account further includes verifying the identifier input and verifying the customer account input.

Another embodiment of the invention also provides a method for supplying communication service value. The method includes establishing a set of identifiers at a central system. Each identifier has an associated service value that is redeemable with a plurality of carriers. The method further includes distributing indicia of at least some of the identifiers to a plurality of merchants for distribution, activating by the central system a first identifier associated with a first indicia upon communication from the merchant of distribution of the first indicia to a customer having a customer account. The method also includes receiving by the central system a request from the customer to add the associated service value to the customer account, and directing by the central system addition of the associated service value to the customer account. In another embodiment of the invention, the request includes identifier input and customer account input, and receiving by the central system a request from the customer to add the associated service value to the customer account further includes verifying by the central system the identifier input and the customer account input.

Also, a system for supplying communication service value is disclosed in accordance with yet another embodiment of the invention. The system comprises a central system, the central system being adapted for distributing indicia of an identifier to a merchant for distribution to a customer having a customer account, the identifier having an associated service value, the associated service value being redeemable with a plurality of carriers, activating the identifier upon distribution of the indicia to the customer, receiving a request from the customer to add the associated service value to the customer account, and adding the associated service value to the customer account.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Figure 1:
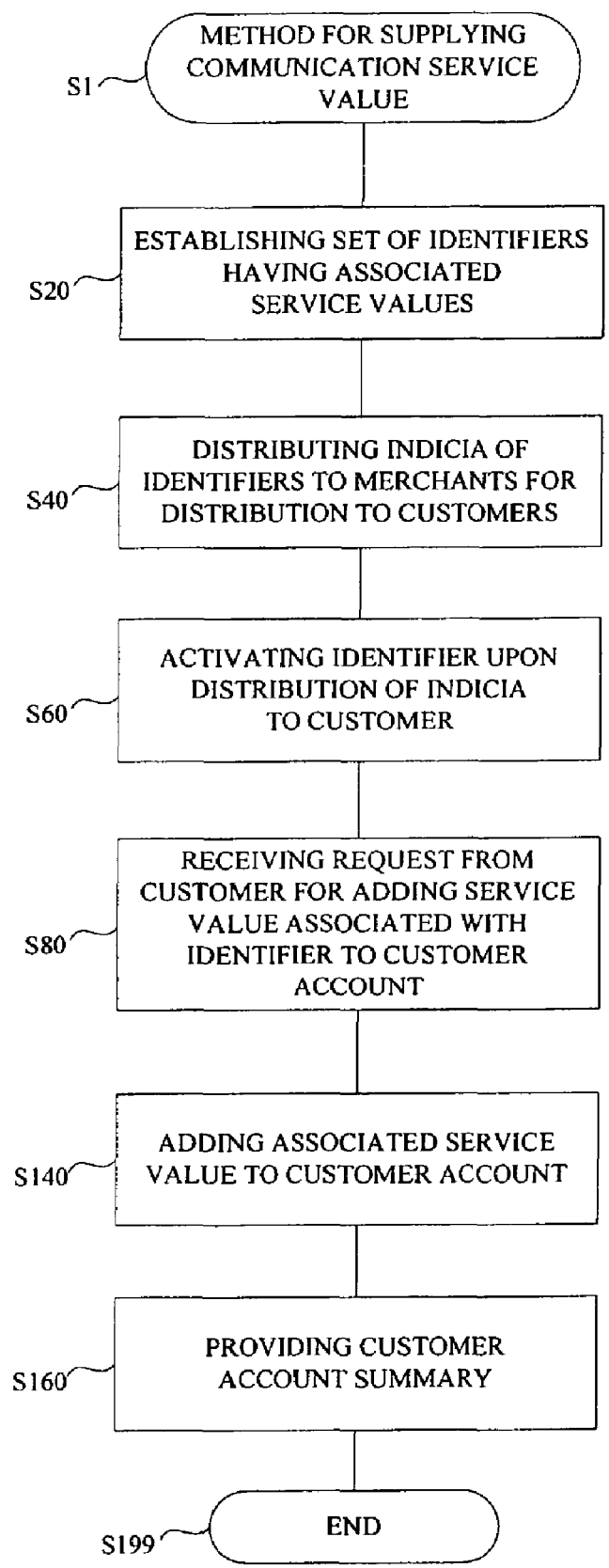
FIG. 1 is a flowchart showing a method for supplying communication service value in accordance with one embodiment of the invention.

Hereinafter, various embodiments of the invention will be described. As used herein, any term in the singular may be interpreted to be in the plural, and alternatively, any term in the plural may be interpreted to be in the singular.

The systems and methods, as disclosed herein, are directed to the problems stated above, as well as other problems that are present in conventional techniques. Any foregoing description of various products, methods, or apparatus and their attendant disadvantages described in the "Background of the Invention" is in no way intended to limit the scope of the invention, or to imply that invention does not include some or all of the various elements of known products, methods and apparatus in one form or another. Indeed, various embodiments of the invention may be capable of overcoming some of the disadvantages noted in the "Background of the Invention," while still retaining some or all of the various elements of known products, methods, and apparatus in one form or another.

As stated above, many wireless telephone users utilize prepaid account arrangements that require payment before communication services will be provided. The prepaid customers pay as they go with the carrier deducting payment for the services provided directly from the customer's account. The invention, through a combination of technologies, provides a customer-friendly process that allows the customer to add service value, i.e., money or usage credits, to his customer account maintained by a carrier selected from a group of participating carriers, such that the customer can get the service needed.

In one aspect of the invention, a central system manages the process that allows the customer to add service value to the customer's account. The central system maintains a set of identifiers, or Personal Identification Numbers ("PINs"), with each identifier having an associated service value, which preferably represents a monetary figure (i.e., number of dollars, $10, $25 or $50, for example), or some unit of service usage (i.e., minutes). Indicia associated with the identifiers are distributed to merchants for further distribution to customers. In one example, the indicia may be distributed on magnetic stripe cards having predetermined values, such as $10, $25 and $50 cards. It should be appreciated that each indicia, or article bearing indicia, is associated with only one identifier maintained at the central system. Thus, each card distributed is linked to only one identifier maintained at the central system.

Once the customer selects the indicia, or an article bearing the indicia, the customer provides payment for the service value associated with the identifier represented by the indicia. For example, the customer pays $25 for a $25 card associated with an identifier associated with a $25 service value. The merchant sends a communication to the central system confirming the transaction with the customer so that the identifier at the central system can be activated. Following instructions provided with the indicia, the customer contacts the central system to have the service value added to the customer's account. The customer provides the central system with an input representing the identifier that has been activated, as well as the customer's account information. The customer's account information can also be utilized to identify the customer's carrier.

When the identifier and customer account information are verified, the central system communicates with the customer's carrier system to add the service value to the customer's account. Following the service value insertion, the customer's updated account information is obtained and provided to the customer. It should be appreciated that in at least one embodiment of the invention, some carriers do not provide direct service value insertion by the central system directly into the customer's account. For these carriers, an alternate carrier identifier is provided by the system, and the customer is transferred to the carrier system to complete the service value insertion.

As seen from the above examples, the central system acts as an intermediary between the customers, merchants and carriers. The central system maintains arrangements with several carriers to allow for value insertion, and becomes a broker of prepaid communication services. The customer is benefited by having access to a resource that can be obtained at several points of sale and allows an easy method to replenish service value for a number of participating carriers. The carriers benefit by having a product in the marketplace whereby customers can more easily replenish customer account balances. Lastly, the merchants benefit from increased sales because they are selling a product that is in demand because it is a single product that allows customers to select from a number of carriers.

In at least one implementation of the invention, the central system manages at least one relational database of information while also allowing access by the various users of the central system (i.e., customers, merchants, and administrators), to the various features and interfaces of the invention. A relational database system allows information contained in different tables to be accessed and shared, while also providing the additional advantage that changes to data contained in one table of a relational database affects the same data in any other table sharing the same data. A table is a collection of several data records with similar data information fields. Data records represent a collection of data that is organized into fields. These fields may also be formatted to receive data of varying types. Accordingly, the central system, or a user of the system, can process, query or report data contained in the various data tables and records for use in accomplishing the features of the invention. In one aspect of the invention, the various databases could include the set of identifiers and Mobile Identification Numbers ("MINs"), for example.

Method for Supplying Communication Service Value

In accordance with one embodiment of the invention, an illustrative flowchart showing a method for supplying communication service is shown in FIG. 1 and described below.

The process begins in step S1, and passes to step S20, which includes establishing a set of identifiers having associated service values. As described above, each identifier forms a part of a data record, or identifier record, that allows the central system to identify the specific associated service value that will later be sold to a customer. One example of an identifier is a Personal Identification Number ("PIN"). The PIN comprises one field of the identifier record, while another field in the same identifier record contains the associated service value. Illustratively, record X may have identifier ABC and an associated service value of $25. The service value is preferably a monetary figure (i.e., an amount in dollars, $10, $25 or $50, for example), but may also represent some unit of service usage, if supported by the carrier systems (i.e., minutes).

The set of identifiers forms the identifier database. Each identifier record may also contain fields for Status Indicator (i.e., whether the identifier is Active or Inactive), Serial Number, Visa Account Network Number (VAN 16), or a Merchant Code identifying the merchant through which the indicia will be distributed.

Following the establishment of the set of identifiers, in step S40, the process includes distributing indicia of the identifiers to merchants for distribution to customers. As described above, the indicia provides information related to the identifier for several reasons. First, the indicia allows the merchant to communicate to the central system the identifier that must be activated following distribution. Similarly, the information conveyed by the indicia later allows the customer to communicate to the central system the identifier and the service value purchased when the indicia was obtained from the merchant. It should be appreciated that the indicia may also encompass any article bearing such information. In other aspects, the indicia may provide instructions to the customer for communicating with the central system.

The indicia may comprise an article, such as magnetic stripe card, smart card, bar coded card, or any combination thereof. Either the magnetic stripe, chip or bar code would contain information that represents the card's identifier. Therefore, when completing the sale of the card to the customer, the merchant could swipe the card through a network terminal, or alternatively, scan the bar code on the card. The merchant's system would then locate the identifier and notify the central system of the sale of the article bearing the associated identifier.

To allow the customer to utilize the card upon purchase, the card also displays the identifier so that the customer can communicate the identifier to the central system. In addition, the card should display the service value associated with the identifier represented on the card to facilitate the customer's purchase of the correct card. Lastly, the card should contain instructions for communicating with the central system, i.e., a general toll-free number.

The indicia may also be provided to the customer through the delivery of a receipt or other notice. In such an embodiment, the customer would commence a purchase transaction at the point of sale, either through the merchant or a system device, such as a verifone terminal. The customer would request a certain prepaid service value, and upon payment, the central system would deliver the identifier to the point of sale for distribution to the customer.

Then, in step S60, the process includes activating an identifier upon distribution of indicia to a customer. As described above, the identifiers may be activated following communication from the merchants of the indicia distribution to the customers. This measure assists in avoiding the theft of the indicia prior to payment. The activation may include changing a status indicator associated with the specific identifier record from Inactive to Active. The communication between the merchant and central system preferably comprises a "host-to-host or Visanet connection", but may include any network communication wherein the central system receives input from the merchant system confirming the transaction. Accordingly, the features of the present invention may use or be combined with any of the features described in U.S. application Ser. No. 09/641,363, filed Aug. 18, 2000, which is incorporated herein by reference in its entirety.

Following the distribution of the indicia to the customer, in step S80, the process includes receiving a request from the customer for adding the service value associated with the identifier to a customer account. To handle the request, in one embodiment of the invention, the central system includes an Interactive Voice Response ("IVR") system that the customer can contact through a dedicated telephone number. Upon calling the number, the customer is presented with a series of voice prompts, process selections and other options that assist the customer in requesting that the service value purchased be added to the customer account.

It should be appreciated that the IVR system may be configured to provide voice prompts to the customer requesting customer input, accepting the customer's input (i.e., by capturing the DTMF, for example), and processing the customer's input to provide adequate responses and take the necessary actions. The customer's request includes the customer's entire communication session with the central system, i.e., the customer's interaction with the IVR system.

Hereinafter, it should be appreciated that any request for input from the customer by the IVR system may be in the form of a voice prompt or message requesting the customer to select a numbered option on a telephone keypad. Although contemplated for automated use, at anytime during communication with the IVR system, the customer may choose an option that provides for transfer to customer service personnel who will complete the transaction for the customer.

Additionally, the IVR system may be configured to accept customer input meeting certain criteria, such as the correct number of digits in a number. When the customer input does not fit within the predetermined criteria (i.e., a 10-digit telephone number when the IVR system requests the customer's MIN), the IVR system may be configured to allow the customer to repeat an input, or when a certain predetermined number of incorrect inputs are received, transfer the customer to customer service personnel. The IVR system may also be configured to provide language selection features (i.e., the customer selects the language for the voice prompts, such as English, Spanish, French, German, for example), customer selection confirmation features, help features, customer instructions or other navigation features that may be accessed at anytime during communication with the central system.

While the above examples describe accessing the central system through the use of an IVR system, access to the central system may be achieved via any suitable communication interface, Ethernet connection, modem, telephone, digital or analog connections with the system using wireless communication devices (i.e., mobile phones, PDAs, or other handheld wireless communication devices), point of sale device or transceiver device (i.e., a verifone terminal, for example), token ring, Internet or Intranet or other computer connection, or any other suitable connection that allows the customer to receive input from and send output to the central system through the network connection.

Figure 2:
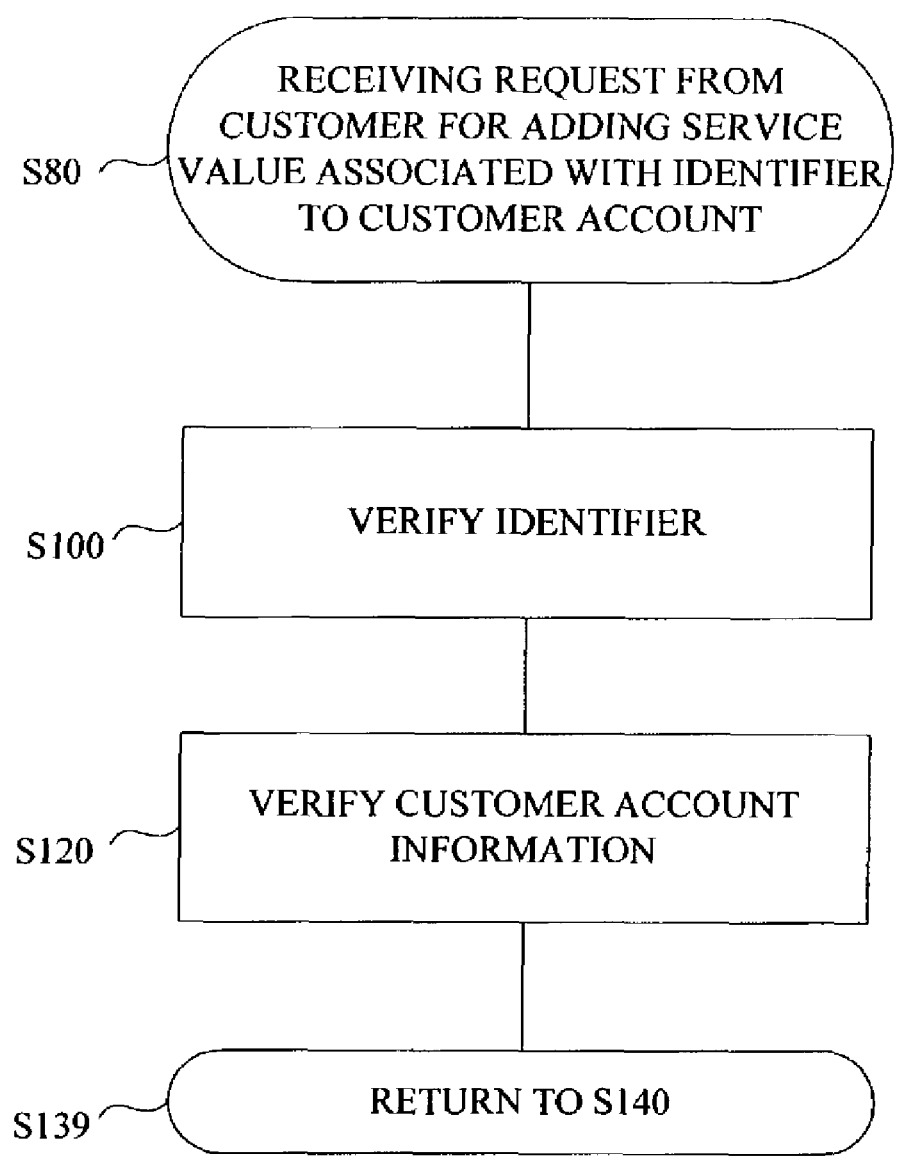
FIG. 2 is a flowchart showing the "receiving request from customer for adding service value associated with identifier to customer account" step of FIG. 1 in further detail in accordance with one embodiment of the invention.

FIG. 2 is a flowchart showing the "receiving request from customer for adding service value associated with identifier to customer account" step of FIG. 1 in further detail in accordance with one embodiment of the invention. The request from the customer to add the service value to the customer's account must include an identifier input (i.e., the PIN) representing the identifier associated with the indicia purchased, as well as input from the customer describing the customer's account (i.e., the customer's Mobile Identification Number, which allows the central system to identify the customer's carrier). Thus, as shown in FIG. 2, the process continues in step S80 and passes to step S100, wherein the identifier is verified. Following verification of the identifier, in step S120, the customer account information is verified.

Figure 3:
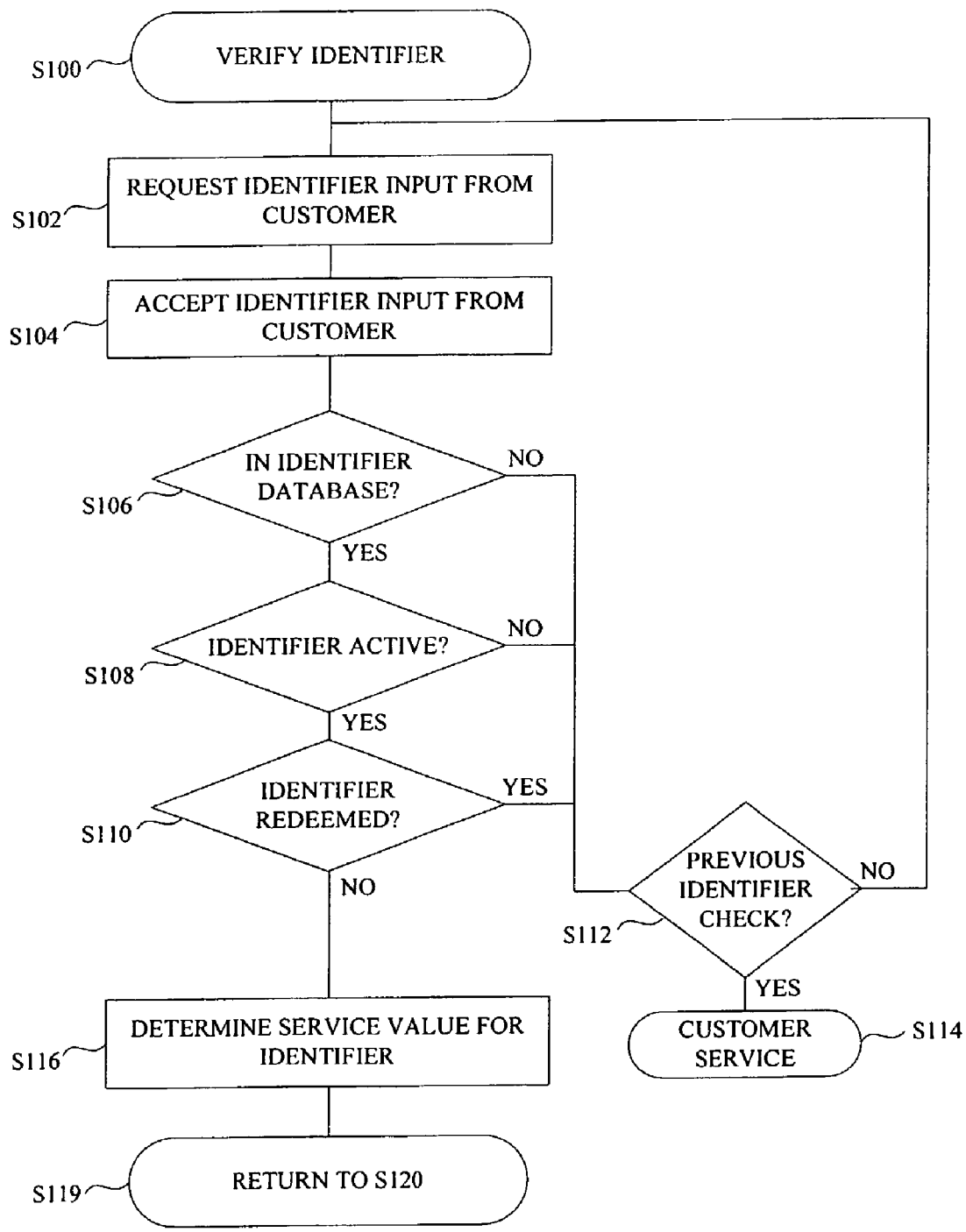
FIG. 3 is a flowchart showing the "verify identifier" step of FIG. 2 in further detail in accordance with one embodiment of the invention.

FIG. 3 is a flowchart showing the "verify identifier" step of FIG. 2 in further detail in accordance with one embodiment of the invention. As shown in FIG. 3, the process continues in step S100, and passes to step S102, wherein the IVR system requests the identifier input from the customer (i.e., voice prompt requesting PIN from card, for example). In step S104, the system accepts the identifier input from the customer (i.e., the PIN provided on the card, for example). Then, in step S106, the system determines whether the identifier input correlates with an identifier from the set of identifiers maintained by the central system. The central system compares the PIN provided by the customer with those kept in the identifier database. If a record containing the PIN is found on the database, the process passes to step S108. If the identifier is found in the database, the system determines whether the identifier is active in step S108. The status of the identifier can be determined by relating a Status Indicator associated with the pertinent identifier record. Thus, when the central system finds the identifier record, it can determine whether a value in the Status Indicator field represents Active or Inactive status. If the identifier is found in the database and is active, the system determines whether the identifier has already been redeemed in step S110. This feature allows the central system to inform the customer that the identifier has already been redeemed. In some circumstances, the customer's communication session with the central system may be ended prematurely, before confirmation of the value insertion procedure. When this occurs, the customer may not be aware that the value insertion function was completed in the prior call. Thus, if the customer had previously called within a certain period (i.e., the last 24 hours), the central system can inform the customer that the value insertion was successful. If the identifier has not been redeemed, the process passes to step S116.

If the identifier cannot be found in the database in step S106, or the identifier is found in the database but is determined to be inactive in step S108, or the identifier is found in the database and is active, but is determined to have already been redeemed in step S110, the process passes to step S112. The system determines whether there has been a previous identifier check in step S112, and if so the process passes to step S114, where the customer is transferred to customer service. A previous identifier check would have occurred if the customer had previously supplied identifier input and the input failed any of the determinations in steps S106, S108 or S110. If there had not been a previous identifier check, the process returns to step S102, where the systems requests that the customer re-enter the identifier input.

For those identifiers found in the system that are active and have not been redeemed, in step S116 the system determines the associated service value for the identifier. The process then passes to step S119, wherein it returns to step S120.

Figure 4:
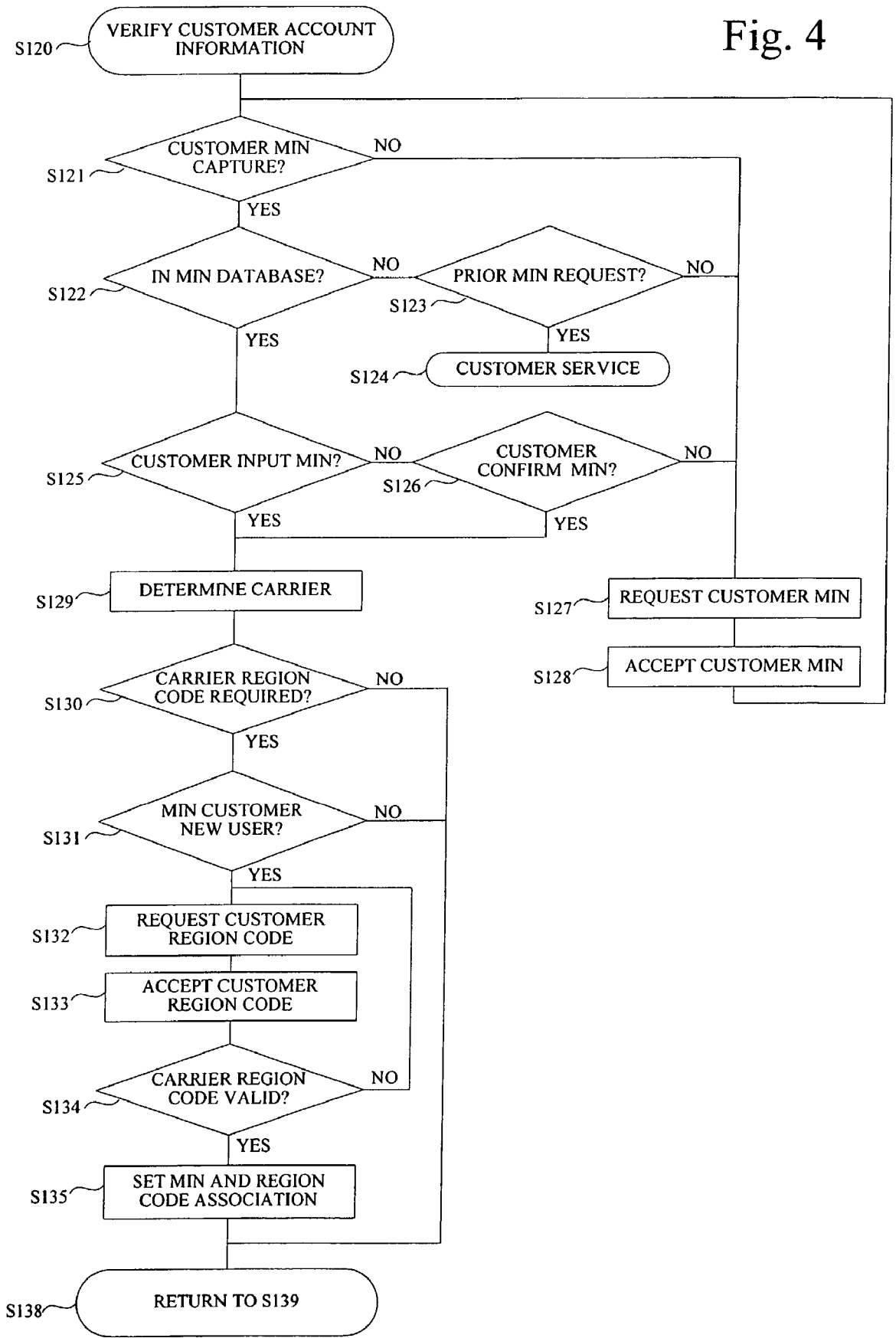
FIG. 4 is a flowchart showing the "verify customer account information" step of FIG. 2 in further detail in accordance with one embodiment of the invention.

FIG. 4 is a flowchart showing the "verify customer account information" step of FIG. 2 in further detail in accordance with one embodiment of the invention. The customer supplies his customer account information to ensure that the service value purchased is credited to the correct customer account, or Mobile Identification Number ("MIN"), at the correct carrier system. As shown in FIG. 4, the process continues in step S120 and passes to step S121. First, the system determines whether the customer MIN was captured when the customer contacted the central system in step S121. The customer's MIN can be captured utilizing Automatic Number Identification ("ANI"), or similar caller ID function. Through ANI, the central system acquires the customer's MIN from the ISDN transmission. Alternatively, the customer may supply his MIN upon request. This would allow the customer to confirm which MIN account the prepaid service value should be credited.

If the customer's MIN has not already been captured, the process passes to step S127. If the MIN has been captured, the process passes to step S122, wherein the system determines whether the customer's MIN can be found in the MIN database. The MIN database is a compilation of existing MINs that includes each MIN, as well as the associated carrier. The MIN database may be stored locally in the central system, or maintained externally in a publicly accessible database, such as Telcordia®. This database may also include one created pursuant to the Wireless Local Number Portability Act. If the MIN is not found in the MIN database, the process passes to step S123. In situations when the MIN is not found in the MIN database, the customer may have contacted the central system using a non-wireless phone or other non-telephone connection, the system prompts the customer to enter the MIN that the customer wishes to add the service value. If the MIN is found in the MIN database, the process passes to step S125.

In step S123, the system determines whether the system has previously requested the customer's MIN from the customer. If so, the process passes to step S124, wherein the customer is transferred to customer service personnel. If the customer's MIN has not been previously requested, the process passes to step S127.

In step S125, the system determines whether the customer input his MIN. If so, the process passes to step S129. If not the customer did not input his MIN, the process passes to step S126, wherein the system determines whether the customer MIN has been confirmed. The confirmation includes input from the customer that the MIN identified is the correct account to add the service value. If the MIN is confirmed, the process passes to step S129.

Alternatively, if the customer MIN is not confirmed, the process passes to step S127, wherein the system requests that the customer provide input representing the customer's MIN for which the service value addition is requested. Then, in step S128, the system accepts the customer's MIN input before returning to step S121.

In step S129, the system determines the customer's carrier. The carrier can be determined by locating the MIN identified in the MIN database and relating the associated carrier. Once the carrier is determined, in step S130, the system determines whether the customer must supply a carrier region code based on the customer's carrier. If not, the process skips to step S138. If the carrier region code is required, the system requests the customer's carrier region code in step S132. The carrier region code may be required for carriers that have regional centers that maintain data on the local mobile phone customers. The carrier region code may be represented by the customer's zip code.

In step S133, the system accepts the customer's carrier region code, and the process passes to the step S134. The system determines whether the carrier region code is valid in step S134. The code will be presumed valid if it can be related to a region code maintained in a carrier specific region code database. If the code is simply the customer's zip code, the system can determine the appropriate carrier region by referring to the carrier database. If the code is not valid, the process returns to step S132, wherein the system requests reentry of the region code. If the code is valid, the process passes to step S135, wherein the system sets an association between the customer's MIN and the carrier region code, to avoid later requests of the code upon subsequent interactions. The process then passes to step S138, wherein it returns to step S139.

Figure 5:
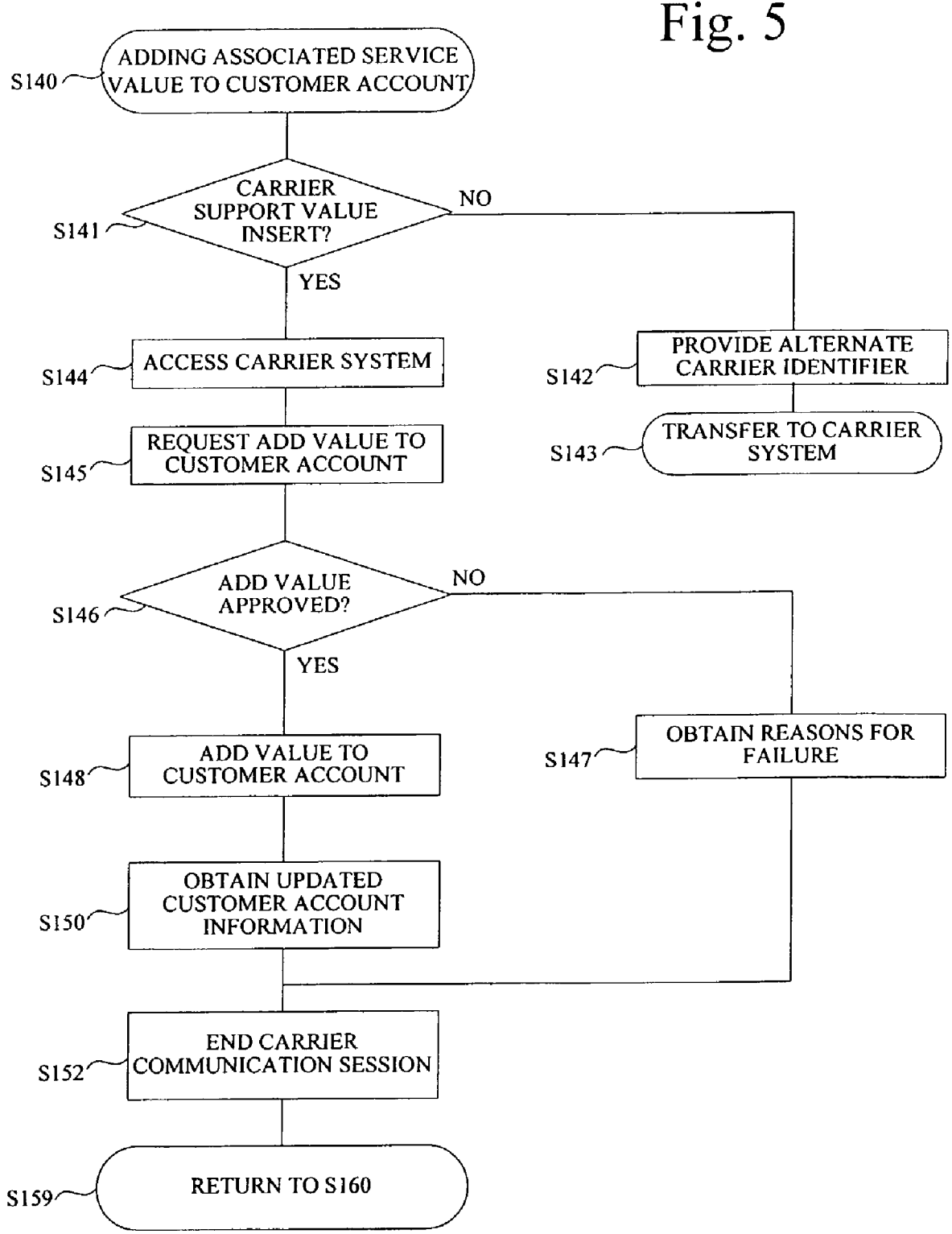
FIG. 5 is a flowchart showing the "adding associated service value to customer account" step of FIG. 1 in further detail in accordance with one embodiment of the invention.

After receiving the customer's request, in step S140, the process includes adding the associated service value to the customer account. FIG. 5 is a flowchart showing the "adding associated service value to customer account" step of FIG. 1 in further detail in accordance with one embodiment of the invention. The process continues in step S140 and then passes to step S141, wherein the system determines whether the customer's carrier support value insertion of service value into its customers' accounts. If the carrier does support direct value insertion, the process passes to step S144, wherein the system access the carrier system. Then, in step S145, the system requests approval from the carrier system to add the service value associated with the identifier to the customer's account. In step S146, the system determines whether the add value request is approved. If so, the process passes to step S148, wherein the system adds the service value to the customer's account, and then passes to step S150, wherein the system obtains updated customer account information from the carrier system. This updated account information may include the new account balance, as well as the account's expiration date, for example. The process then passes to step S152

However, if in step S146, the system determines that the add value request was not approved, the process passes to step S147, wherein the system obtains the reasons from the carrier system that the value insertion was not approved. The process then passes to step S152, wherein the system ends the communication session with the carrier system. The process then passes to step S159, wherein it returns to step S160.

For those carriers that do not support direct value insertion, in step S142, the system provides the customer with an alternate carrier identifier. This carrier identifier operates similarly to the identifier used with the central system, however, the carrier identifier must be redeemed through communication with the carrier system. These carrier identifiers may be maintained in a separate carrier identifier database. Accordingly, in step S143, the system transfers the customer to an IVR system managed by the carrier system to complete the value redemption.

Figure 6:
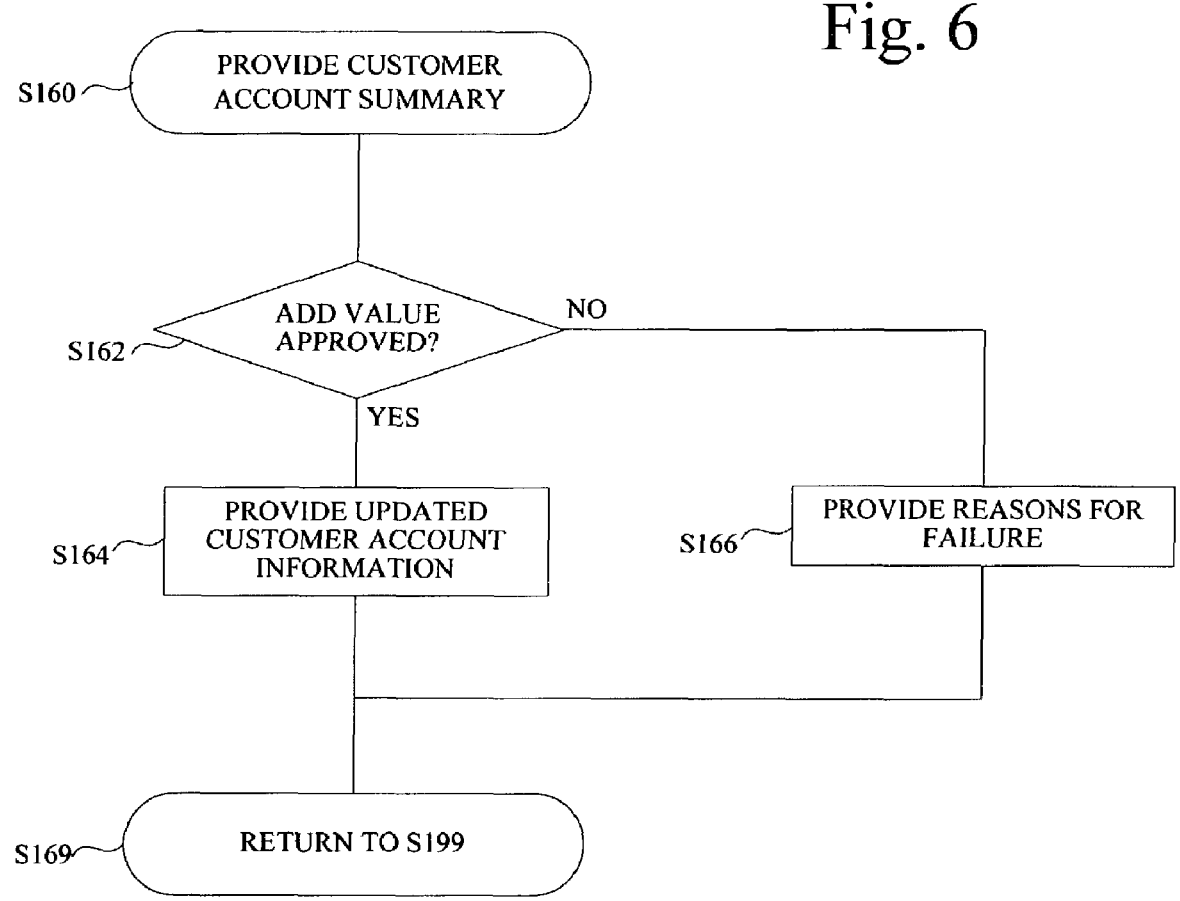
FIG. 6 is a flowchart showing the "provide customer account summary" step of FIG. 1 in further detail in accordance with one embodiment of the invention.

Returning to FIG. 1, in step S160, the process includes providing the customer with a customer account summary. FIG. 6 is a flowchart showing the, "provide customer account summary" step of FIG. 1 in further detail in accordance with one embodiment of the invention. The process continues in step S160, and then passes to step S162, wherein the system determines whether the value insertion was approved by the carriers system. If so, the process passes to the step S164, wherein the system provides the updated customer account information to the customer. The process then passes to step S169. If the value insertion was not approved, the process passes to step S166, wherein the system provides the customer with the reasons for the denial of the request. These reasons may include that the customer's balance in the customer account is already too high or exceeds a predefined limit, the account cannot be found by the carrier, the account has been cancelled or any unspecified carrier error. The process then passes to step S169, where it returns to step S199. Once the system provides the customer with the customer account summary, the process passes to step S199, where it ends.

It should be appreciated that the methods described herein may be adapted such that each indicia of an identifier distributed may not have a predetermined associated service value. In this respect, the indicia would include the identifier, however, the customer would be allowed to select a service value to purchase for the card. Therefore, upon distribution of the card, the customer would select a service value, such as $25, for insertion into the record at the central system. The communication from the merchant would notify the central system of the amount purchased, which would then be inserted into the associated service value field for the record.

Figure 8:
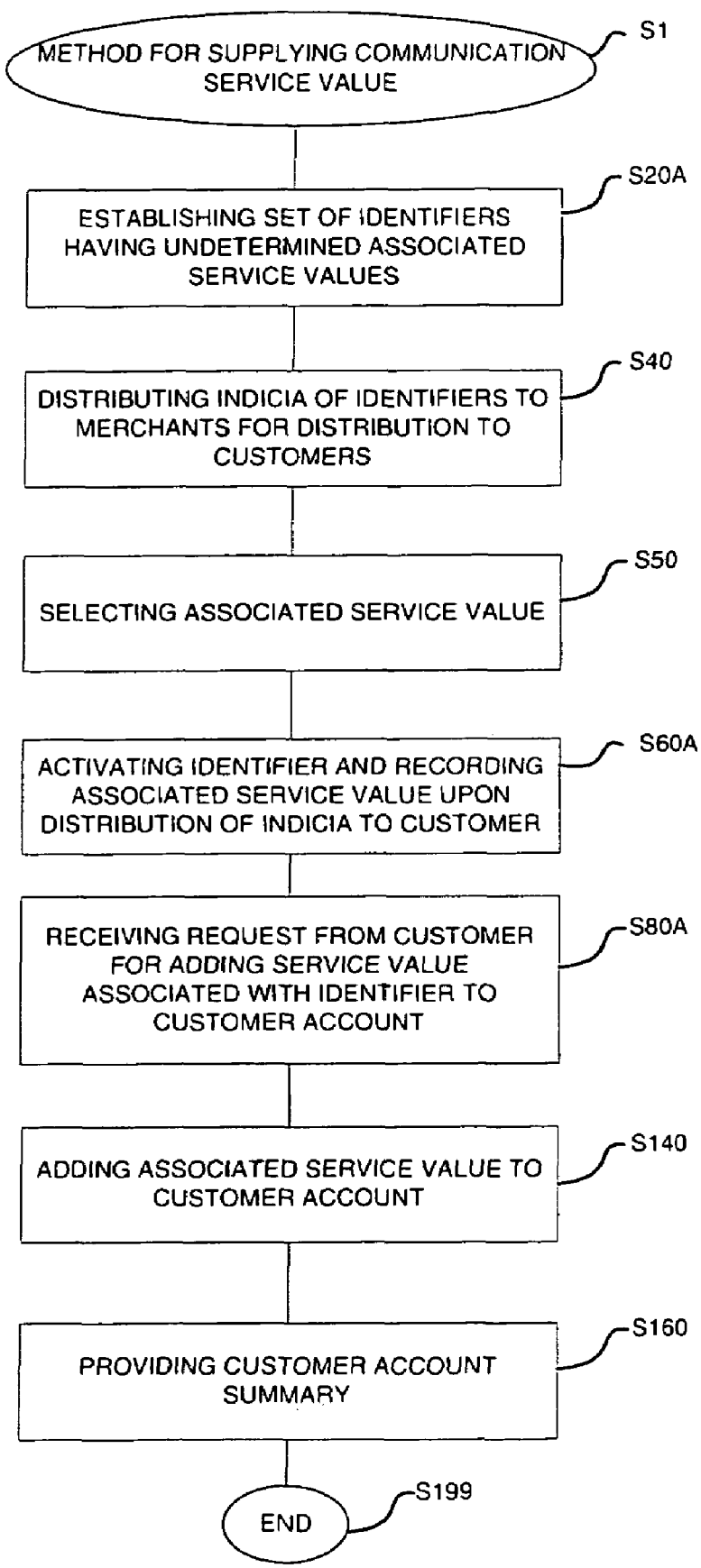
FIG. 8 is a flowchart showing a method for supplying communication service according to an embodiment of the invention.

FIG. 8 is a flowchart showing a method for supplying communication service. This method is very similar to the method of FIG. 1, described above. However, in this embodiment, the associated service value is not initially pre-established, but instead it is determined when it is selected by a customer at the time of distribution of the identifiers to the customer. In this respect, the indicia would include the identifier; however, the customer would be allowed to select a service value, such as $25 or $50, for insertion into the record at the central system. As previously noted, the service value could alternately be a another unit of service usage, such as a number of minutes. The communication from the merchant would notify the central system of the amount purchased, and this information would then be inserted into the associated service value field for the record.

Thus, as shown in FIG. 8, a set of identifiers having undetermined associated service values is established, in step S2OA. Then in step S40, as also shown in FIG. 1, the indicia of identifiers to merchants for distribution to customers is distributed. Unlike in FIG. 1, the process proceeds to step S50, where the customer selects the associated service value, such as $10, $25, or $50. Then in step S6OA, the identifiers are activated and the associated service value is recorded when the indicia is distributed to the customer. In step S8OA, the request from the customer for adding service value associated with the identifier to the customer's account is received. This step is further elaborated in FIG. 9, discussed below. Finally; the associated service value is added to the customer account in step S140, and the customer account summary is provided in step S160.

Figure 9:
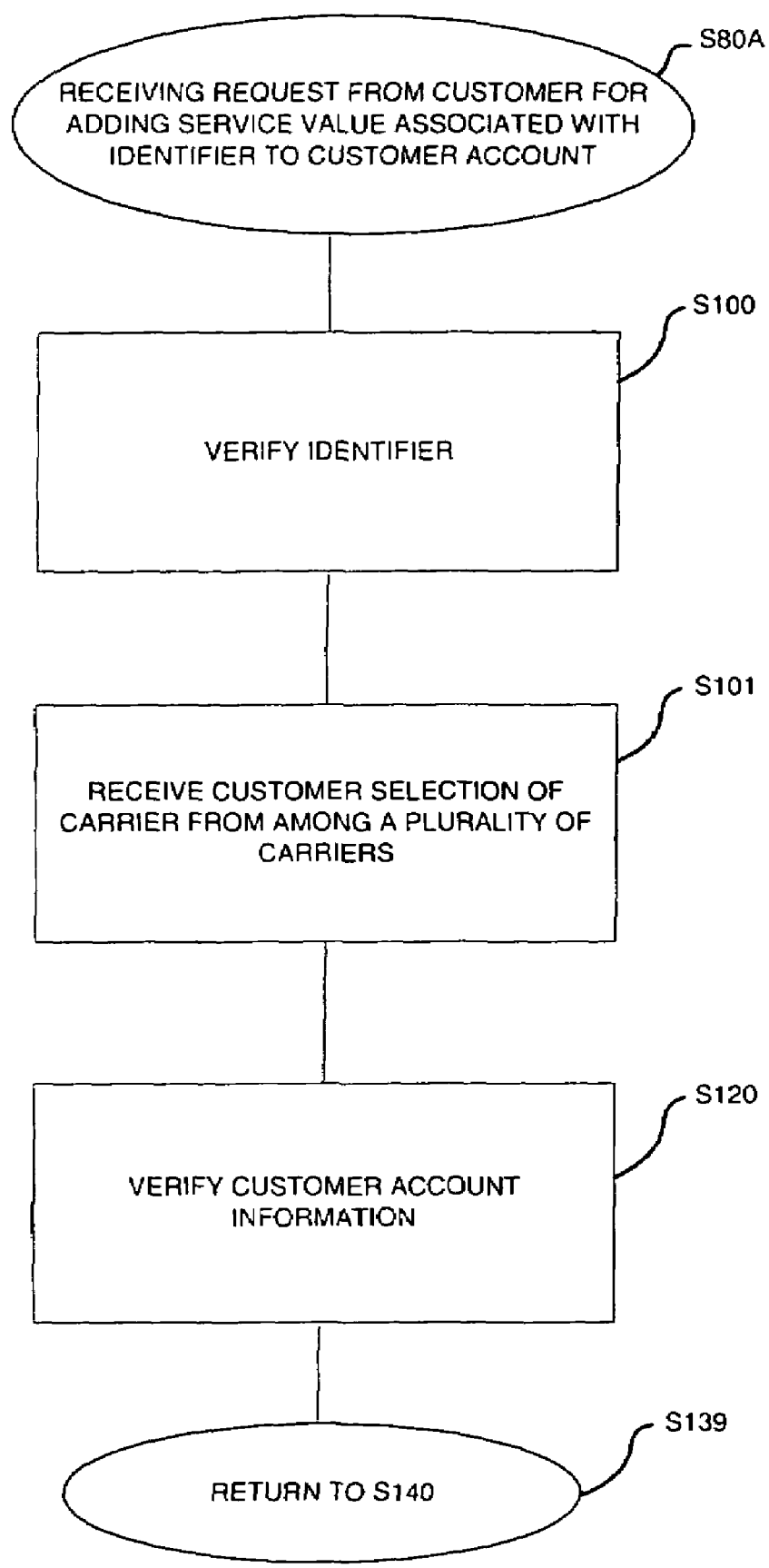
FIG. 9 is a flowchart showing the "receiving request from customer for adding service value associated with identifier to customer account" step of FIG. 8 in further detail in accordance with one embodiment of the invention.

FIG. 9 is a flowchart showing the "receiving request from customer for adding service value associated with identifier to customer account" step of FIG. 8 in further detail in accordance with one embodiment of the invention. This flowchart further elaborates step S80A shown in FIG. 8. The flowchart of FIG. 8 follows the same process as described in FIG. 2, above. However, in this embodiment, it is explicitly shown that after the identifier is verified, in step S100, the customer selects a carrier for service from among a plurality of carriers is received, in step S101.

AN ILLUSTRATIVE COMMUNICATION SERVICE VALUE SYSTEM

Figure 7:
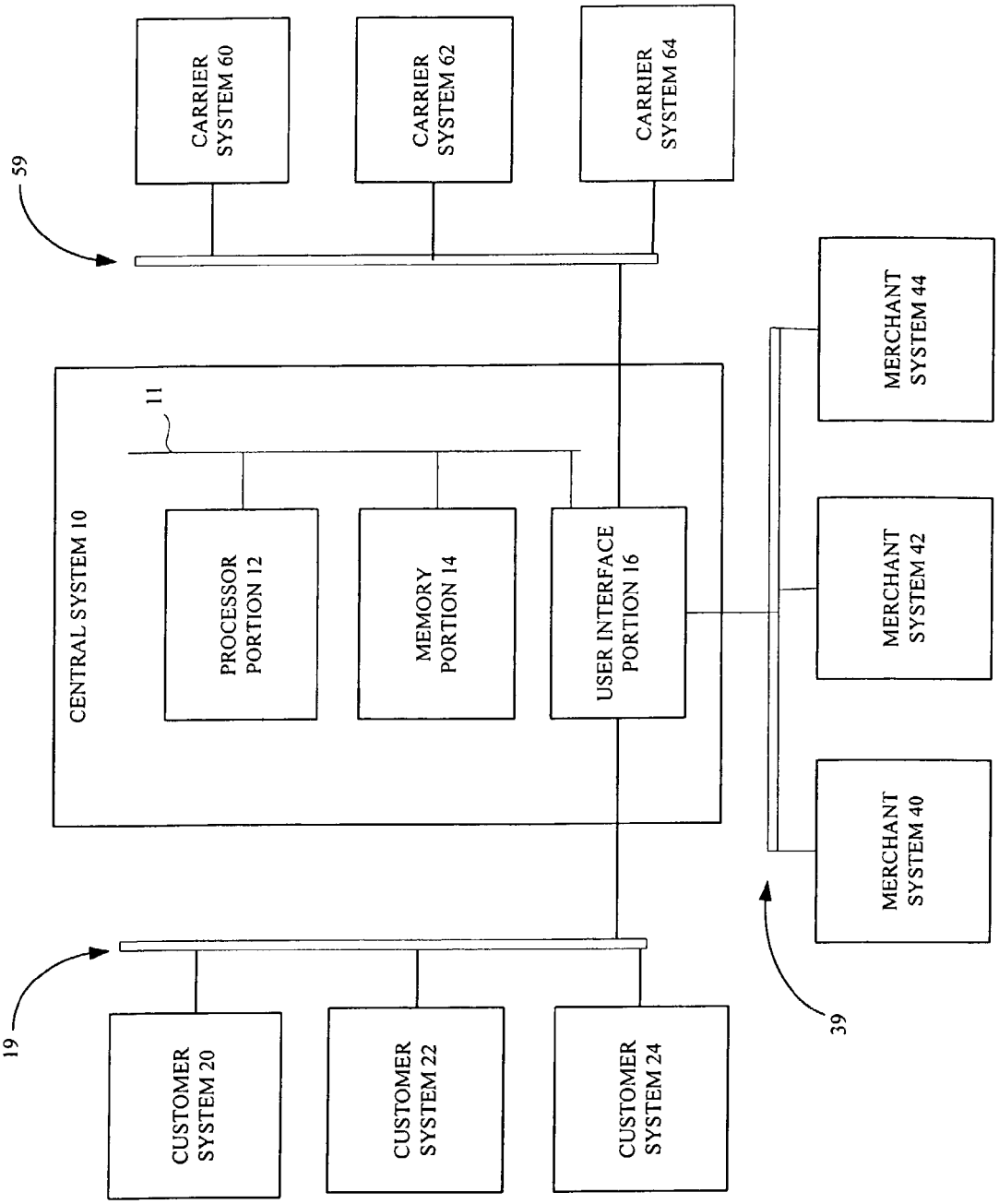
FIG. 7 is a diagram showing an illustrative system for supplying communication service in accordance with one embodiment of the invention.

As described above, FIG. 7 is a diagram showing an illustrative system for supplying communication service value in accordance with one embodiment of the invention. FIG. 7 illustrates a central system 10, a plurality of customer systems 20, 22, and 24, a plurality of merchant systems 40, 42, and 44, and a plurality of carrier systems 60, 62, and 64. Each customer system 20, 22 and 24 is in selective communication with the central system 10 through customer network 19. Each merchant system 40, 42 and 44 is in selective communication with the central system 10 through merchant network 39. Each carrier system 60, 62 and 64 is in selective communication with the central system 10 through carrier network 59. It should be appreciated that customer network 19, merchant network 39 and carrier network 59 may be the same network in some embodiments of the invention.

The central system 10 comprises a processor portion 12 for processing input from and generating output to the various customer, merchant and carrier systems in communication with the central system 10, a memory portion 14, the processor portion 12 retrieving data from and storing data for use by the central system 10 in the memory portion 14, and a user interface portion 16 accepting input from and transmitting output to the various customer, merchant and carrier systems in communication with the central system 10. Each of processor portion 12, memory portion 14 and user interface portion 16 are connected to and in communication with each other through a data bus 11. It should be appreciated that the IVR system may utilize components from each of the processor portion 12, memory portion 14 and user interface portion 16.

The processor portion 12 monitors and controls the various operations of the central system 10. Initially, the processor portion 12 processes the information provided by the merchant system 40 when confirming the indicia distribution and the customer system 20 when accessing, or making requests of, the central system 10. The customers accessing the central system 10 provide their input through the use of user interfaces presented by the user interface portion 16, which includes the voice prompts and options presented by the IVR system.

The memory portion 14 serves as a memory store for a wide variety of data used by the processor portion 12, as well as the other components of the central system 10. For example, in one embodiment, the memory portion 14 contains the various databases of identifiers and associated service values, MINs, carriers, and other information needed by the central and IVR systems. It should be appreciated that the various memory components contained in the memory portion 14 may take on a variety of architectures as is necessary or desired by the particular operating circumstances. Further, the various memory components of the memory portion 14 may exchange data or utilize other memory component data utilizing known techniques such as relational database techniques.

The user interface portion 16 provides the interface through which the user can provide input to and receive output from the central system 10. The user interface portion 16 generally provides interaction capabilities for communicating with the customer, merchant and carrier systems. The user interface portion 16 is controlled by the processor portion 12, or components thereof, to interface with a customer or other operating system, including inputting and outputting data or information relating to the central system 10. The user interface portion 16 also provides the interface between the system administrator, the central system 10, and other remote systems. A system administrator mainly utilizes the user interface portion 16 to manage the storage of data and information in the memory portion 14, as well as provide updates to the central system 10 applications and functions.

In operation, a customer utilizing a suitable customer system 20 accesses the central system 10 through customer network 19. The customer system 20 may be any suitable processing machine, such as a mobile phone, as well as a computer accessing the Internet, personal digital assistants (PDAs) or other wireless communication device, networked to customer network 19. The merchant system 40 may be any suitable processing machine, including a transceiver device (i.e., a verifone terminal, for example) capable of receiving input from the central system, printing indicia or other information, performing smart card or magnetic stripe card reader or bar code scanner functions, and sending output to the central system 10. Accordingly, in one embodiment of the invention, to activate an identifier upon payment, the card is swiped through an appropriate card interface on the merchant transceiver, which initiates a network connection to the central system 10, wherein the central system 10 activates the identifier in the appropriate database.

The user interface portion 16 also transmits data to the customer system 20 to present a user interface on the customer system 20 for accepting input and allowing the customer to submit output to the central system 10. Although these user interfaces have been described with respect to an IVR system, alternate user interfaces may be presented on an Internet web page whereby customers access the page and provide the necessary redemption information on an appropriate form.

Although several customer systems and vendor systems are shown in FIG. 7, it should be appreciated that in some embodiments of the invention, there may be only one customer system and one vendor system, each in selective network communication with the central system 10.

The user interface portion 16 accepts the customer request for value insertion from the customer system 20, including the identifier input and customer account input. The processor portion 12 verifies the identifier input with the identifier database maintained in the memory portion 14, and then verifies the customer account input with the MIN database, either maintained locally in the memory portion 14 or externally in a publicly available database of MINs. The user interface portion 16 then communicates with a carrier system 60 to complete the value insertion process before providing the customer with a customer account summary.

It should also be appreciated that the invention may include a device for distributing communication service value. Such a device may include a distribution terminal (i.e., a verifone terminal-like device or a vending machine-like apparatus) that allows a customer to select a prepaid service value for purchase, and make payment for the service value. The terminal would include a product selection portion for presenting the various service value denominations available (i.e., any user interface for accepting the customer's selection, for example), a payment portion for receiving payment from the customer (i.e., through cash, or magnetic stripe card or smart card readers, for example), a communication portion for notifying the central system of the sale of the indicia and the need to activate the associated identifier (i.e., a modem, for example), and a delivery portion for providing the customer with the indicia of the identifier (i.e., a mechanical card delivery system or printer means to provide a printout of the indicia, for example).

As described above, FIGS. 1-6 illustrate various embodiments of the method of the invention. FIG. 7 represents an illustrative embodiment of the system of the invention. It should be appreciated that the system of the invention or portions of the system of the invention may be in the form of a "processing machine," such as a general purpose computer or other network operating system, for example. As used herein, the term "processing machine" is to be understood to include at least one processor that uses at least one memory. That at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, a dedicated circuit, IP based connection, the Internet, Intranet, Extranet, LAN, WAN, VPN, an Ethernet, or any client server system that provides communication, for example. Such communications technologies may use any suitable protocol such as TCP/IP, UDP, OSI, SNA, X.25, ISO 85/83, XML or SOAP, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may comprise a series of Interactive Voice Responses, or take the form of a dialogue screen, for example. A user interface may be in the form of a web page or other interactive application presented on a customer system by the customer's browser. The web page or application could include fields for accepting data and transmitting data to the advertising marketing system for storage. A user interface may also include any of a mouse, touch screen, keyboard, keypad, card slot, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It is understood that the present invention may be practiced by adding additional steps to the method, omitting steps within the process, and/or altering the order in which the steps are performed in the process.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method for supplying stored value comprising the steps of:

distributing indicia of an identifier to a merchant for distribution to a customer having a pre-existing pre-paid customer account with a specific provider other than the merchant, the identifier having an associated stored value wherein the identifier is a predetermined identifier stored in a database prior to activating the identifier over a private network, the associated stored value redeemable with a plurality of providers including the specific provider, the indicia of the identifier having an indication of the providers with which the associated stored value may be redeemed disposed visibly thereon;

activating at a central processor the identifier upon a distribution of the indicia to the customer, wherein the central processor is in selective communication with the merchant over a private network, the customer, and the plurality of providers;

receiving at the central processor a request from the customer to add the associated stored value to the pre-existing pre-paid customer account;

determining the specific provider and the pre-existing pre-paid account based on the request and the identifier;

verifying by the customer that the correct specific provider and pre-existing pre-paid account has been determined; and adding at the central processor the associated stored value to the pre-existing pre-paid customer account based on the verification step.

2. The method of claim 1, wherein the indicia is located on an article.

3. The method of claim 2, wherein the article is selected from the group consisting of: a magnetic strip card, a smart card, and a card having a bar code.

4. The method of claim 1, wherein the identifier is a Personal Identification Number (PIN).

5. The method of claim 1, wherein the associated stored value is selected from the group consisting of: represented in dollars, and represented in an amount of communication service.

6. The method of claim 1, wherein the distribution of indicia to the customer includes receiving payment for the associated stored value from the customer.

7. The method of claim 1, wherein the pre-existing customer account is represented by a Mobile Identification Number (MIN) or an equivalent unique identifier.

8. The method of claim 1, wherein the step of activating the identifier upon a distribution of the indicia to the customer further comprises:

receiving at the central processor a communication of the distribution of the indicia to the customer; and updating at the central processor a status indicator for the identifier from inactive to active.

9. The method of claim 1, wherein the step of verifying that the correct specific provider and pre-existing pre-paid account comprises:

accepting at the central processor identifier input associated with the identifier from the customer;

determining at the central processor that the identifier is represented in an identifier database;

determining at the central processor that the identifier is active; and determining at the central processor that the identifier has not been redeemed.

10. The method of claim 9, further comprising identifying the associated stored value for the identifier.

11. The method of claim 1, wherein the step of verifying that the correct specific provider and pre-existing pre-paid account further comprises:

accepting at the central processor customer account input associated with the pre-existing pre-paid customer account from the customer; and determining at the central processor that the pre-existing pre-paid customer account is represented in a customer account database.

12. The method of claim 11, wherein the step of verifying at the central processor the pre-existing pre-paid customer account input further comprises identifying a provider associated with the pre-existing pre-paid customer account.

13. The method of claim 12, wherein the provider is a wireless communication service provider, and wherein the step of verifying at the central processor the pre-existing pre-paid customer account input further comprises:
determining at the central processor that a provider region code is required based on the provider;
requesting at the central processor provider region code input from the customer; and
accepting at the central processor provider region code input from the customer.

14. The method of claim 1, wherein the step of adding at the central processor the associated stored value to the pre-existing pre-paid customer account further comprises:
determining at the central processor that the provider supports adding stored value to provider-managed pre-existing pre-paid customer accounts;
accessing at the central processor a provider system associated with the provider; and
adding the stored value at the central processor to the pre-existing pre-paid customer account.

15. The method of claim 14, wherein the step of the central processor adding the associated stored value to the pre-existing pre-paid customer account, further includes obtaining updated customer account information upon adding the stored value to the pre-existing pre-paid customer account.

16. The method of claim 15, wherein the updated customer account information comprises an updated customer account balance reflecting the adding of the stored value to the pre-existing pre-paid customer account.

17. The method of claim 1, wherein the associated stored value is a predefined value that is stored in a database prior to activating the identifier.

18. The method of claim 1, wherein the identifier is associated with the stored value in a database prior to activating the identifier.

19. The method of claim 1, wherein the indicia comprises an indicia code, and wherein the identifier is associated with the indicia code and the stored value in a database prior to activating the identifier.

20. The method of claim 1, wherein the indicia comprises an indicia code associated with the identifier in a database prior to activating the identifier, wherein the act of activating the identifier comprises:
receiving at the central processor a request to activate the identifier, wherein the request comprises the indicia code; and
processing at the central processor the database, to determine the identifier based on the received indicia code; and
activating at the central processor the identifier, so that its associated stored value can be subsequently added to a pre-existing pre-paid customer account.

21. The method of claim 1, wherein the request to add the associated stored value to the pre-existing pre-paid customer account comprises the identifier and customer account identification information.

22. The method of claim 1, wherein the indicia comprises an indicia code usable to activate the identifier, and wherein the request to add the associated stored value to the pre-existing pre-paid customer account does not comprise the indicia code.

23. The method of claim 1, wherein the pre-existing pre-paid customer account is represented by an identification number specific to a telecommunications service device associated with the pre-existing pre-paid customer account.

* * * * *